(12) United States Patent
Bloechl et al.

(10) Patent No.: US 10,484,932 B2
(45) Date of Patent: Nov. 19, 2019

(54) BLE NETWORKING SYSTEMS AND METHODS PROVIDING CENTRAL AND PERIPHERAL ROLE REVERSAL WITH ENHANCED PERIPHERAL LOCATION DETERMINATION USING ULTRASONIC WAVEFORM

(71) Applicant: Link Labs, Inc., Annapolis, MD (US)

(72) Inventors: Mark Bloechl, Elkridge, MD (US); Ricardo Luna, Jr., Las Cruces, NM (US); Patrick Li, Potomac, MD (US)

(73) Assignee: LINK LABS, INC., Annapolis, MD (US)

( * ) Notice: Subject to any disclaimer, the term of this patent is extended or adjusted under 35 U.S.C. 154(b) by 0 days.

(21) Appl. No.: 16/255,246

(22) Filed: Jan. 23, 2019

(65) Prior Publication Data

US 2019/0159109 A1    May 23, 2019

Related U.S. Application Data

(63) Continuation-in-part of application No. 16/177,915, filed on Nov. 1, 2018, which is a continuation-in-part of application No. 15/626,083, filed on Jun. 17, 2017.

(51) Int. Cl.
| | |
|---|---|
| *H04W 48/10* | (2009.01) |
| *H04W 4/80* | (2018.01) |
| *H04W 48/20* | (2009.01) |
| *H04B 11/00* | (2006.01) |
| *H04W 64/00* | (2009.01) |
| *H04W 84/18* | (2009.01) |
| *H04W 84/12* | (2009.01) |

(52) U.S. Cl.
CPC ............ *H04W 48/10* (2013.01); *H04B 11/00* (2013.01); *H04W 4/80* (2018.02); *H04W 48/20* (2013.01); *H04W 64/00* (2013.01); *H04W 84/12* (2013.01); *H04W 84/18* (2013.01)

(58) Field of Classification Search
CPC ..................................................... H04W 88/08
See application file for complete search history.

(56) References Cited

U.S. PATENT DOCUMENTS

| 5,920,287 A | 7/1999 | Belcher et al. |
| 6,469,628 B1 | 10/2002 | Richards et al. |

(Continued)

FOREIGN PATENT DOCUMENTS

| EP | 1420550 A2 | 5/2004 |
| WO | 2016053909 A1 | 4/2016 |

OTHER PUBLICATIONS

Bluetooth Core Specification v 5.0, Dec. 2016, pp. 252-256.
(Continued)

*Primary Examiner* — Hsinchun Liao
(74) *Attorney, Agent, or Firm* — Charles B. Lobsenz; Brian H. Buck; Potomac Law Group, PLLC

(57) ABSTRACT

Provided are systems and methods for reversing the conventional roles of central and peripheral devices in a BLE network. Doing so includes implementing an end node (EN) as the sole initiator of a connection between a particular EN and a particular access point (AP). Such implementation includes determining a coordinate location of the EN based on position information for multiple reference points (RPs) and a time of flight (TOF) of an ultrasonic waveform transmitted by each of the RPs.

24 Claims, 13 Drawing Sheets

(56) References Cited

U.S. PATENT DOCUMENTS

| | | |
|---|---|---|
| 7,141,715 B2 | 11/2006 | Shapira |
| 7,242,294 B2 | 7/2007 | Warrior et al. |
| 7,411,921 B2 | 8/2008 | Strong et al. |
| 7,518,500 B2 | 4/2009 | Aninye et al. |
| 7,973,655 B2 | 7/2011 | Blinnikka et al. |
| 8,026,814 B1 | 9/2011 | Heinze et al. |
| 8,368,555 B2 | 2/2013 | Gilbert et al. |
| 8,712,330 B2 | 4/2014 | Desai et al. |
| 8,831,627 B2 | 9/2014 | Aninye et al. |
| 8,849,926 B2 | 9/2014 | Marzencki et al. |
| 9,282,582 B1 | 3/2016 | Dunsbergen et al. |
| 9,328,857 B2 | 5/2016 | Conte et al. |
| 9,374,667 B1 | 6/2016 | Jorgensen et al. |
| 9,426,616 B1 | 8/2016 | Rasband et al. |
| 9,439,041 B2 | 9/2016 | Parvizi et al. |
| 9,788,167 B2 | 10/2017 | Geng et al. |
| 9,992,633 B2 | 6/2018 | Geng et al. |
| 2002/0045424 A1 | 4/2002 | Lee |
| 2005/0113132 A1 | 5/2005 | Irsheid et al. |
| 2005/0250519 A1 | 11/2005 | Samuel |
| 2007/0001813 A1 | 1/2007 | Maguire et al. |
| 2007/0004426 A1 | 1/2007 | Pfleging et al. |
| 2007/0036119 A1* | 2/2007 | Haddad ............... H04L 63/123 370/338 |
| 2007/0046459 A1 | 3/2007 | Silverman et al. |
| 2009/0092049 A1 | 4/2009 | Hargrave et al. |
| 2010/0131567 A1 | 5/2010 | Dorogusker et al. |
| 2010/0195872 A1* | 8/2010 | Velardo ............. G06K 9/00771 382/106 |
| 2012/0311149 A1 | 12/2012 | Trevino et al. |
| 2013/0060351 A1 | 3/2013 | Imming et al. |
| 2013/0065603 A1 | 3/2013 | Hovav |
| 2013/0281084 A1 | 10/2013 | Batada et al. |
| 2013/0314210 A1 | 11/2013 | Schoner et al. |
| 2013/0317944 A1 | 11/2013 | Huang et al. |
| 2014/0149004 A1 | 5/2014 | Best et al. |
| 2014/0324615 A1 | 10/2014 | Kulkami et al. |
| 2015/0003433 A1* | 1/2015 | Sinha ................... H04L 63/107 370/338 |
| 2015/0282113 A1 | 10/2015 | Costa |
| 2015/0296332 A1 | 10/2015 | Lee et al. |
| 2015/0356498 A1 | 12/2015 | Casanova et al. |
| 2016/0012196 A1 | 1/2016 | Mark et al. |
| 2016/0078738 A1 | 3/2016 | Basalamah et al. |
| 2016/0105762 A1 | 4/2016 | Singh et al. |
| 2016/0112886 A1 | 4/2016 | Malik et al. |
| 2016/0117213 A1 | 4/2016 | Arjun et al. |
| 2016/0127883 A1 | 5/2016 | Zhou et al. |
| 2016/0127996 A1 | 5/2016 | Patil et al. |
| 2016/0142868 A1 | 5/2016 | Kulkarni et al. |
| 2016/0163115 A1 | 6/2016 | Furst |
| 2016/0183042 A1 | 6/2016 | Weizman et al. |
| 2017/0041963 A1 | 2/2017 | Edge |
| 2017/0076332 A1 | 3/2017 | Jung et al. |
| 2017/0085417 A1 | 3/2017 | O'Reirdan et al. |
| 2017/0366944 A1 | 12/2017 | Geng et al. |
| 2017/0374690 A1 | 12/2017 | Maddali et al. |
| 2018/0084588 A1 | 3/2018 | Khoury et al. |
| 2018/0160282 A1 | 6/2018 | van de Poll |
| 2018/0160334 A1* | 6/2018 | Deshpande ........... H04W 28/08 |

OTHER PUBLICATIONS

International Search Report and Written Opinion issued for application No. PCT/US2019/023222 dated Jun. 18, 2019.
Partial International Search Report and Written Opinion issued for application No. PCT/US2019/023228 dated Jun. 14, 2019.
International Search Report and Written Opinion issued for application No. PCT/US2019/023226 dated Jun. 18, 2019.

* cited by examiner

BLE NETWORKING SYSTEMS AND METHODS PROVIDING CENTRAL AND PERIPHERAL ROLE REVERSAL WITH ENHANCED PERIPHERAL LOCATION DETERMINATION USING ULTRASONIC WAVEFORM

CROSS-REFERENCE TO RELATED APPLICATIONS

This is a continuation-in-part of application Ser. No. 16/177,915, filed Nov. 1, 2018, which in turn is a continuation-in-part of application Ser. No. 15/626,083, filed Jun. 17, 2017, now U.S. Pat. No. 10,244,373, issued on Mar. 26, 2019, the entire contents of each of such Applications are hereby incorporated by reference, and to which priority is claimed under 35 U.S.C. § 120.

FIELD OF THE DISCLOSURE

Disclosed embodiments relate to wireless communications, and more specifically, to wireless communication among BLUETOOTH Low Energy (BLE) equipped devices in which conventional BLE central and peripheral roles of those devices are reversed and made applicable to nodes of a BLE-enabled network so as to enhance BLE networking capability, including refining determinations of a location of a node operating as a peripheral to ascertain that location within a coordinate system.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between a peripheral device, such as an end node (EN), and a central device, such as an access point (AP).

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement. However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Also, in the context of BLE and other RF communication protocols there sometimes exists barriers to receipt of signaling among intended devices. These barriers may, as alluded to above, be due to natural occurrences such as congestion, or otherwise be defined by artificial structures in the vicinity or vicinities in which operation of the devices is desired. As a consequence, important information which is associated with a respective one or more of the devices, such as its location or other collected and communicable data may be unable to be delivered with optimum efficiency and accuracy. Because of this, operators of systems dependent upon knowing such important information may be denied the capability to carry out intended duties, such as those which may be involved in encompassing project tasks like those of asset tracking and temperature or other variable monitoring, just to name of few.

Thus, it would be desirable to provide for one or more optimized BLE networking relationships that address and overcome the aforementioned impediments and disadvantages now associated with the conventional BLE central/peripheral networking relationship discussed above. More specifically, it would be desirable to provide applicability of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking assets to be inventoried and for which location must be determined, whether in a commercial or residential setting, as well as any other application in which a BLE networking protocol is deployed.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a BLE communications system providing an end node (EN), an access point (AP) configured to connect to a network and transmit a first beacon advertisement message, and a plurality of reference points (RPs) each configured to not connect to the network and transmit each of a second beacon advertisement message comprising position information, and an ultrasonic waveform. The EN is configured to detect the first and second beacon advertisement messages and the ultrasonic waveform, and initiate a connection with the AP in which, as a result of the connection, the AP is caused to transfer to the network identifying information of each of the EN and the AP. As such, the detection of a respective one of the second beacon advertisement messages triggers the EN to begin the detecting of the ultrasonic waveform.

A further aspect of the embodiments includes a BLE communications system providing an end node (EN), an access point (AP) configured to connect to a network and transmit a first beacon advertisement message, and a plurality of reference points (RPs) each configured to not connect to the network and transmit each of a second beacon advertisement message comprising position information, and an ultrasonic waveform. The EN is configured to detect the first and second beacon advertisement messages and the ultrasonic waveform, calculate a time of flight (TOF) of the ultrasonic waveform transmitted from each of the plurality of RPs, and determine, within a coordinate system within which each of the EN, RPs and AP are operable, a coordinate position of the EN based on the TOFs, and initiate a connection with the AP in which, as a result of the connection, the AP is caused to transfer to the network identifying information of each of the EN and the AP, and the coordinate position.

A still further aspect of the embodiments includes a method of BLE communication providing executing, by one or more processors among a BLE end node (EN), a BLE access point (AP) configured to connect to a network, and a plurality of BLE reference points (RPs) configured to not connect to the network, a set of instructions. The instructions provide for transmitting a first and a second beacon advertisement message from the AP and each of the plurality of RPs, respectively, each second beacon advertisement message comprising position information, transmitting an ultrasonic waveform from each of the plurality of RPs, detecting the first and the second beacon advertisement messages at the EN, and detecting at least one of the ultrasonic waveforms in response to detection of at least one of the second beacon advertisement messages. The instructions further provide for initiating a connection between the AP and the EN, in which, as a result of the connection, the AP is caused to transfer to the network identifying information of each of the EN and the AP, and a position of the EN based on at least a pair of the ultrasonic waveforms.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
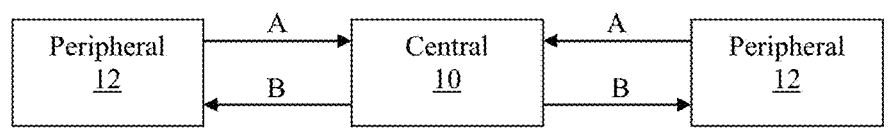
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B."

Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
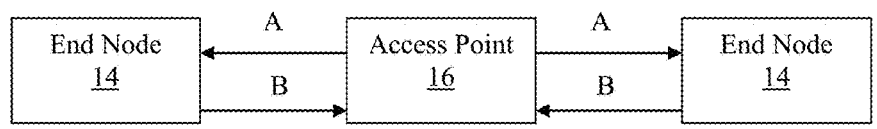
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary BLE end nodes (ENs) 14 are responsible for detection of a beacon advertisement message transmitted from an exemplary BLE access point (AP) 16 in the direction of arrows "A," and moreover, whereby such ENs 14 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective EN 14, and whereas such aspect or aspects, rather, are solely evaluated and/or determined by the EN 14 so that the EN 14, itself, is enabled to then solely initiate and/or establish the aforementioned connection, if doing so is deemed appropriate by the EN 14. Herein, the term, "initiate" means taking any initial steps or enacting any initial procedures, and the terms, "establish," or "established" mean taking any steps or enacting any procedures related to whether to cause and/or maintain a connection between an AP 16 and an EN 14, and thereafter making and/or maintaining such connection.

Figure 3:
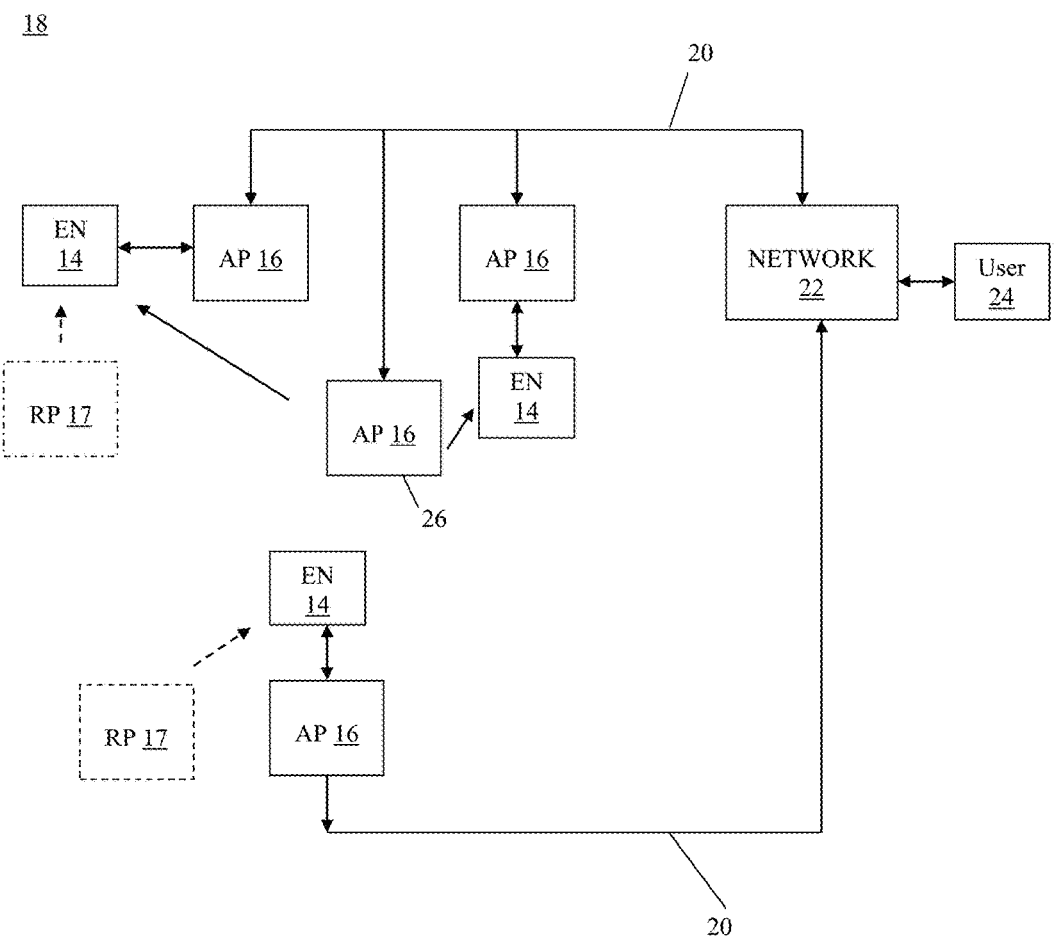
FIG. 3 is an illustration of a BLE-enabled network in accordance with FIG. 2.
Figure 4:
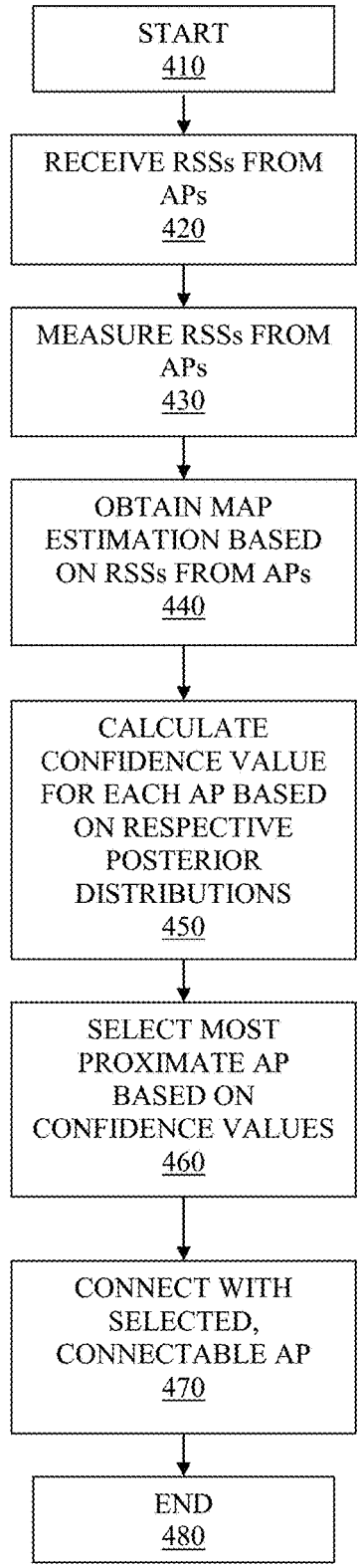
FIG. 4 is a sequence diagram of proximity association of a BLE EN with a BLE AP, in accordance with FIG. 3.
Figure 5:
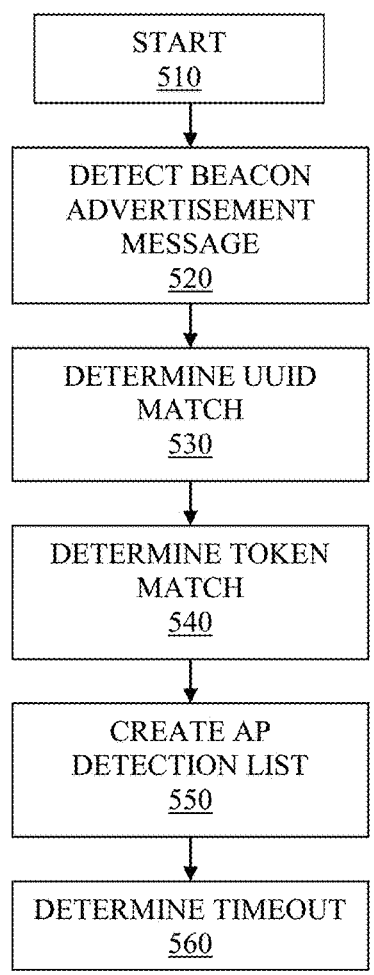
FIG. 5 is a sequence diagram of detection, by a BLE EN, of a BLE AP, in accordance with FIG. 3.
Figure 6:
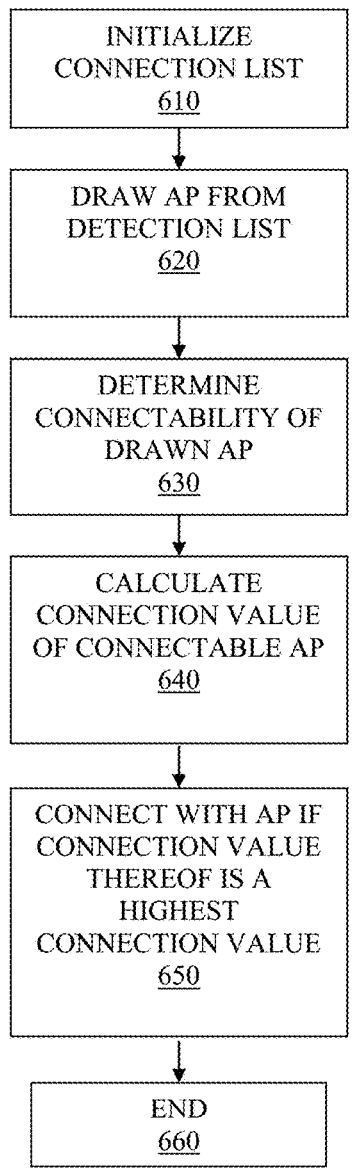
FIG. 6 is a sequence diagram of connection, by the BLE EN, with the BLE AP, in accordance with FIGS. 3 and 5.

FIGS. 3-6 and their accompanying descriptions below address various manner of associating an EN 14 to an AP 16. Therein, FIG. 3 illustrates a BLE-enabled network and communications system thereof, FIG. 4 illustrates a manner of proximity association of a BLE EN to a BLE AP, FIG. 5 illustrates a manner of detection, by a BLE EN, of a BLE AP, and FIG. 6 illustrates a manner of connection, by a BLE EN, with a BLE AP. Throughout, it is to be understood that an EN 14 does not, at any time, transmit to an AP 16 its location, but rather, the location of the EN 14 may be determined by relative association of one or more APs 16 or reference points (RPs) 17.

Specifically, FIG. 3 illustrates a BLE-enabled network 18 and communications system thereof according to the present embodiments in which ENs 14 detect a received signal strength (RSS) of all beacon advertisement messages transmitted from the APs 16, solely determine proximity with respect to the APs 16, and further, solely initiate and establish all connections therebetween the ENs 14 and APs 16, in response to having evaluated and/or made a decision with respect to, for example, such RSS, information contained in the beacon advertisement message, and/or other information, as discussed below in regard to FIGS. 4-6. Once a connection between an EN 14 and an AP 16 is made, data such as, optionally, identifying information, other than location information, of the EN 14 and identifying information of, other than the connected AP 16, the most proximate AP 16, and contained information of the EN 14 including, for example, sensory information thereof, may be transferred to the respective AP 16 for delivery through a backhaul 20, implemented by a cellular, WiFi, or Low Power Wide Area Network (LPWAN) configuration, to a network or cloud service 22 for transfer to an end user terminal 24, such as a personal computing or other electronic device enabled to convey the aforementioned information. Pertinent identifying and/or location information of the APs 16 and RPs 17 are known to the network 22. Such network or cloud service 22 includes any one of available data and connectivity platforms to allow users of nodes within network 18 to, for instance, manage and distribute information pertinent to the nodes and/or information desired in the administration of the nodes. An example of such a platform is CONDUCTOR, available from Link Labs, Inc. of Annapolis, Md.

As mentioned, EN 14 may transmit identifying information, i.e., the media access control (MAC) address, of the AP 16 which is most proximate to the EN 14. Such AP 16 may or may not be an AP 16 which is connectable to the network 22, as is explained below. In these regards, it is to be understood that an AP 16 is connectable if able to connect to the network 22 via backhaul 20, and as non-connectable if unable to make such connection. For instance, non-connectable APs 16 defining RPs 17, which may or may not be present in the network 18 according to FIG. 3, are shown in dashed lines, as are transmissions of their beacon advertisement messages.

Relative to communications between an EN 14 and an AP 16, network 22 is configured to message an EN 14, in order to provision certain ones of settings of the EN 14. Among these settings are aspects of a heartbeat message, i.e., a message sent by the EN 14 to the network 22 which informs the network 22 of the communication state of the EN 14. As examples, such aspects may include one or more of a battery configuration, a heartbeat message interval defining a period of time between transmissions of heartbeat messages, "scans per fix" defining a number of scans to be conducted for every proximity location determination of a most proximate stationary AP 16, as well as any update information in relation to any of the aforementioned aspects. A transmitted heartbeat message will include the MAC address of a most proximate stationary AP 16 and/or RP 17.

Further, it is to be understood that, while communications between an EN 14 and AP 16 are discussed herein in the context of the BLE protocol, it is contemplated that such communication may also be optionally achieved according to another wireless protocol, as appropriate. Also, it is to be understood that EN 14 and AP 16 are exemplary of first and second network nodes, respectively, which may be similarly configured as are EN 14 and AP 16 to carry out communications with respect to the BLE networking described herein and/or according to the other, appropriate wireless protocol discussed above.

In an exemplary case in which a respective EN 14 is mobile, the EN 14 is configured with an estimator comprising appropriate software and/or hardware for causing an estimating of proximity to a given AP 16 or RP 17, based on RSS, and is also configured with appropriate software and/or hardware for performing all operations associated with initiating and/or establishing a connection with an AP 16. All discussion herein regarding a determination of proximity of an AP 16 is to be understood as being equally applicable to determination of proximity of a RP 17.

The estimator conducts a Bayesian Estimation, and specifically a maximum a posteriori (MAP) estimation for each AP 16 encountered by the mobile EN 14 at the time of the encounter, i.e., at the time of receipt of a single or multiple beacon advertisement messages, so as to account for either a single RSS, or alternatively, multiple RSSs. In other words, the MAP estimation may reflect either (1) a single RSS at the time of receipt of a beacon advertisement message from the respective AP 16 or (2) in order to mitigate RF hopping, a predetermined number of consecutive RSSs, e.g., five RSSs, resulting from multiple beacon advertisement messages from the respective AP 16. Furthermore, the EN 14 and its estimator may also be configured to undertake the MAP estimation at any time during operation of the EN 14. The estimation is given by the following Equation (1), $$p(x_t|y_{1:N}) = p(y_{1:N}|x_{1:N}) \int p(x_t|x_{t-1}) p(x_{t-1}|y_{t-1}) dx_{t-1} \quad \text{Equation (1)}$$

In this way, the posterior distribution, $p(x_t|y_{1:N})$, for a given proximity between a particular EN 14 and AP 16 pair at time, t, is determined. In particular, such determination is made by advancing the next most previous posterior, $p(x_{t-1}|y_{t-1})$ time, t−1, to the current time, t, given $p(x_t|x_{t-1})$. It is contemplated that a variance of the previous estimate, $p(x_{t-1}|y_{t-1})$, is increased by a predetermined rate. Accordingly, a new posterior estimate may be obtained based on all observations by an EN 14 in accordance with Equation (2), as follows:

$$p(y_{1:N}|x_{1:N}) = \prod_{i=1}^{N} p(y_i|x_i). \quad \text{Equation (2)}$$

Therein, $x_i$ represents a variable distance from an EN 14 to an AP 16, $y_i$ represents a RSS of a beacon advertisement message and N represents a number of observations, i.e., a number of received beacon advertisement messages. In this regard, the highest value, or minimum variance, distribution is chosen as the MAP estimate.

Once the MAP estimate is obtained, a confidence value, representing a level of expectation that a respective AP 16 is most proximate to the EN 14, is calculated for each AP 16 encountered by the EN 14, based on the estimated posterior distribution and Equation (3) below, and insofar as a 10 dB predetermined variance in RSS is set as an optional, acceptable variance therefor:

$$P_{\overline{10dB}} = 1 - 2Q\left(\frac{10 \text{ dB}}{\sigma_{posterior}}\right). \quad \text{Equation (3)}$$

Thus, it is to be understood that another variance level could be set as the predetermined variance depending upon, for example, device configuration(s) of one or more of the AP 16 and EN 14.

Selection of which AP 16 is most proximate to the EN 14 is determined as that AP 16 which yields the highest confidence value. However, if a further AP 16 yields a next most confident value corresponding to a predetermined tolerance for the confidence value, selection of the AP 16 that is most proximate to the EN 14 is determined from among all of the APs 16 which have broadcast a beacon advertisement message received by the EN 14. Still further, a signal strength from a respective AP 16 may be adjusted, in accordance with an adjustment factor included in the beacon advertisement message, to confer exclusive selection thereof by the EN 14, i.e., any other AP 16 whose beacon advertisement message the EN 14 has received is excluded from being considered as being most proximate to the EN 14. It is to be understood, that the estimator of a particular EN 14 may be configured to create a statistical fingerprint of AP 16 associations so as to optimize interpretation of future association patterns.

FIG. 4 sets forth a sequence of the above proximity determination enabling association of a respective EN 14 to a respective AP 16.

Therein, flow begins at decision block 410 and proceeds to decision block 420 at which an EN 14 receives a RSS from one or more APs 16. Thereafter, at decision block 430, the EN 14 measures the RSSs. At decision block 440, the estimator, which is configured integrally with the EN 16, calculates a MAP estimation for each of the RSSs. Subsequently, at decision block 450, EN 14 calculates a confidence value from each of the estimated posterior distributions. At decision block 460, the AP 16 yielding a highest confidence value is selected as the most proximate AP 16 to the EN 14. Flow then proceeds to decision blocks 470-480 in response to the selection by the EN 14. At decision block 470, EN 14 records the selection of the AP 16 according to identifying information thereof, including, for example, its network address or other appropriate networking identifying information. At decision block 480, the proximity association process ends.

Furthermore, it is contemplated that EN 14 may modulate its behavior depending upon certain conditions. For example, EN 14 may vary the frequency with which it conducts its MAP estimate depending upon whether the EN 14 is stationary or moving. That is, EN 14 may perform its estimation more frequently if it is moving, and less often if it is stationary. Still further, EN 14 may be configured to perform some predetermined action depending upon whether it is at a predetermined location (e.g., activate a light-emitting device (LED) or alarm) and/or whether no further AP 16 is detected (e.g., deactivate a device).

Additionally, and in accordance with FIGS. 5-6, the decision as to which AP 16 a mobile EN 14 should connect with, and to which it may transmit the identifying information of the most proximate AP 16, is determined based on attainment of a highest connection value calculated by the mobile EN 14. That is, as a mobile EN 14 moves in proximity to one or more APs 16, the value of connection with any one of the APs is assessed based on several components including the confidence value, in accordance with FIG. 4, and an associated weighting factor, a network loading value and an associated weighting factor, and an association factor of the broadcasting AP 16, and is given by the following Equation (4):

$$\sigma = \alpha \cdot P + \beta \cdot L + \gamma, \text{ in which} \quad \text{Equation (4)}$$

σ represents the connection value, as an absolute value, α represents a weighting factor assigned to the confidence value calculated by the EN 14, P represents the confidence value, β represents a weighting factor assigned to loading of the connected network, L represents a loading value of the connected network and is included in the beacon advertisement message, and γ represents an association factor for a respective AP 16, such that y equals zero if the EN 14 has not made a previous connection with the respective AP 16 and equals a predetermined highest value if the respective AP 16 is the AP 16 with which the EN 14 has made a most previous connection.

In this way, an EN 14 that moves among various APs 16, which may or may not be connectable to the network 22, may determine an optimal connection among such APs 16 based on the aforementioned components yielding the highest connection value in accordance with Equation 4.

Once such connection is made, as indicated by the exemplary double arrows of FIG. 3, the connected AP 16 may receive from the EN 14 the identifying information of another AP 16 that is most proximate in a case in which the connected AP 16 has been determined to have attained the highest connection value, but not the highest confidence value. The other, most proximate AP 16 may include another connectable AP 16, indicated at 26 in FIG. 3, to which connection has not been made due to it not achieving the highest connection value. Thus, it is to be understood that the consideration of the confidence value in Equation 4 increases the likelihood that the most proximate AP 16 is the one to which EN 14 connects. However, this scenario is not certain given connectability of one or more APs 16 and other considerations used in determining the connection value according to Equation (4).

The manner of determining the above optimal connection at the mobile EN 14 is demonstrated by the flow of FIGS. 5-6. FIG. 5 provides a sequence for scanning for detection of a beacon advertisement message respectively transmitted from one or more APs 16, while FIG. 6 provides a sequence for determining an AP 16 with which the EN 14 should connect, based on the above-discussed connection value, a, as determined in accordance with Equation 4.

Flow begins in FIG. 5 at decision block 510 and proceeds to decision block 520 at which EN 14 scans for and detects a respective beacon advertisement message from one or more APs 16, whose identifying and/or location information is known to the network 22. Thereafter, at decision block 530, EN 14 processes a detected beacon advertisement message to determine a Universally Unique Identifier (UUID) match wherein identifying data of the AP 16 broadcasting the beacon advertisement message is confirmed as belonging to the network 22. From there, flow proceeds to decision block 540 to determine and confirm a token match. If a match is confirmed at 540, the broadcasting AP 16 is, at decision block 550, added to a list of detected APs 16 ("detection list") for which decisions at blocks 530 and 540 have been confirmed. During operation of the estimator at decision blocks 520-540, the estimator of EN 14 calculates respective confidence values for the detected APs, and records each of the respective confidence values for the detected APs 16 such that attained confidence value is associated with a respective, detected AP 16 when such AP 16 is added to the detection list, and also its selection of the most proximate AP 16. Thereafter, it is determined at decision block 560 whether the scanning operation has timed out. If not, as in the case of negative decisions at decision blocks 530 and 540, scanning continues. If the scanning operation has timed out, flow proceeds, as shown in FIG. 6, to determine which AP 16, from among the detection list, the EN 14 should connect.

Based on a timeout having occurred and the detection list, flow then proceeds, from decision block 560, to decision block 610 of FIG. 6 so as to initialize a list of APs 16 to which the EN 14 should connect (so as to provide a "connection list"). Once this connection list is initialized, an AP 16, with its associated confidence value, is drawn from the detection list, at decision block 620, at which point it is then determined, at decision block 630, if such AP 16 is connectable to the network 22 of FIG. 3, for example. If the drawn AP 16 is connectable, flow then proceeds, with respect to such drawn AP 16, to decision block 640 whereat a connection value therefor is calculated in accordance with Equation (4). Flow is then iterative through decision blocks 620-640 until detection list provided at decision block 550 is empty. From among respective connection values calculated at decision block 640, EN 14 selects and connects with, at decision block 650, the AP 16 having a highest connection value in accordance with Equation (4), and proceeds to an end at decision block 660 once connection is established.

During that connection, however, identifying information, other than location information, of a RP 17 which is determined to be most proximate to the EN 14 may be transmitted, by the EN 14, to the AP 16 with which the aforementioned connection has been established.

In this way, the aforementioned proximity determination according to the discussed confidence value serves the dual purpose of both determining an estimate of which AP 16 and/or RP 17 is most proximate to an EN 14, and providing a basis for determining which AP 16 the EN 14 should connect. That is, the AP 16 with which the EN 14 ultimately connects may receive identifying information of a non-connectable RP 17 that is most proximate to the EN 14 so that a relative determination of the location of the EN 14 may be determined with reference to this latter, non-connectable RP 17. In this way, the granularity of the proximity determination above is increased such that non-connectable PRs 17, and not only connectable APs 16, are each considered by the estimator of EN 14 so as to render available a more accurate AP/EN proximity association.

Accordingly, as mobile EN 14 moves in and out of range of one or more APs 16, connection with a respective one thereof may be made based upon the aforementioned confidence and connection values, such that the connected AP 16 likewise may yield a highest confidence value so as to be most proximate to the EN 14, and represent the optimal connection according to Equation (4). In this case, such proximity will be made known to the user 24 by virtue of the established connection and the lack of any other AP 16 identifying information being transferred to the network 22.

Such ability of a EN 14 to select and connect with a specified, respective one of APs 16 removes the shortcomings of conventional BLE networking by enabling a mobile EN 14 to have the autonomy necessary to initiate and/or establish connection with an AP 16 solely in response to its own evaluation and decision making with respect to aspects contributing to the aforementioned proximity association, connection value and/or other information associated with the EN 14. For instance, such other information may optionally include one or more parameters relating to operation of the EN 14.

In removing the aforementioned shortcomings, it will be apparent that the embodiments discussed herein eliminate the conventionally overwhelming number of advertisements transmitted by peripherals in conventional BLE networking. That is, the present embodiments substantially reduce the number of advertisements occurring at a given time by virtue of the BLE role reversal, discussed herein, in which plural end nodes receive, rather than transmit, advertisements in the form of beacon advertisement messages from one more access points.

Once connected, the EN 14 may then transfer its own identifying information, other than location information, and identifying information of the most proximate AP 16 and/or RP 17. In this way, when information of an AP 16 other than the connected AP 16 is not transferred, it will be understood that the connected AP 16 is most proximate to the EN 14. Concurrently with the transfer of the above information, the EN 14 may also transfer one or more of its contained information including sensory information, access information, notification information, alarm information, and any other status and/or content information thereof as may be applicable to its particular configuration. For instance, it is contemplated that EN 14 may transfer any of the aforementioned types of information so as to be applicable to such environments including a workplace or other type of commercial environment in which commerce is a purpose, a residence, and a medical facility or other facility in which tracking of persons or objects is necessary and/or desired.

The following examples describe instances of associating a particular end node (EN) 14 to a particular access point (AP) 16. Further, such examples are set forth in the context of the BLE-enabled network 18 of FIG. 3 and with the exemplary understanding that an EN 14, which may be defined as a BLE tag and/or a BLE tag attached to or associated with a particular object, is seeking association with a BLE AP 16 that is configured to report information of the tag to an end user 24 via backhaul 20 and network 22. In these regards, it is contemplated that EN 14 and AP 16 may be embodied as being any stationary and/or mobile nodes of an appropriate wireless network, and as being capable of operating according to a BLE protocol or other protocol in which such nodes may operate as respective first and second nodes according to any of FIGS. 4, 5, and/or 6. Also, in these regards, it is to be understood that a respective EN 14 may be configured to calculate its confidence and connections values at the same time, or, at different times. It is to be understood that EN 14 may undertake any of the processes of FIGS. 4-6 at any time, whether the EN 14 is mobile or stationary. Thus, the EN 14 is configured to optimize, at least, a rate at which connection may be established, with respect to, at least, proximity of such connection as well as the efficiency of such connection, as will be understood based on the components of Equation (4).

In a first instance, it is contemplated that such tag is attached to an object, such as a hospital bed for which it is desirous to know the location thereof at any given point in time when it is moving throughout a hospital environment. Thus, assume that the hospital bed, with the tag attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs whose location is known to the hospital network. As that travel occurs, the tag attached to the bed will scan for beacon advertisement messages transmitted from the various APs. Upon receipt of the transmitted signals, the tag is configured to conduct the MAP estimation discussed hereinabove and calculate a highest confidence value for the AP that is in closest proximity at a given point in time and which may or may not be connectable to the hospital network. The tag is further configured to connect with a particular connectable AP having a highest connection value, as shown by the exemplary double arrows extending between an exemplary EN 14 and AP 16 of FIG. 3, so that the identifying and other information of the closest proximity AP may then be transferred to the end user. In this way, as the bed and attached tag may continue to move, the process of determining proximity of the tag to both connectable APs 16 and non-connectable RPs 17 continues until, optionally, such point in time when the bed and attached tag are stationary such that identifying information of a further, different AP need not be reported.

More particularly, and continuing with the example scenario above, the attached tag is alternatively, and optionally, configured to conduct a scan of broadcasting APs and assess their UUID and token information so as to qualify those APs to be included on a detection list resulting from the scan and from which connection with a specified one thereof will occur in order to transfer the tag's identity, identity information of the AP to which the tag is most proximate, and/or contained information of the tag to an end user. Once this detection list is compiled and scanning is completed, embodiments of the present disclosure contemplate the tag being configured to initialize a connection list of APs, from among the APs compiled on the detection list. Once initialized, the tag is further contemplated to conduct a determination of whether an AP is connectable to the network 22 via backhaul 20 so as to be able to transfer information of the tag to an end user desirous of knowing the location of the hospital bed. Each connectable AP is then evaluated as to its associated connection value in accordance with Equation (4) above.

More specifically, the connection value for each AP, that is determined to be connectable to the network 22, is assessed based on components comprising a confidence value representing a level of expectation that a respective AP is most proximate to the tag and an associated weighting factor, a network loading value and an associated weighting factor, and an association factor of the AP. In regard to the association factor, it is contemplated that such factor be deemed to have a value of zero if the tag has not connected with the AP being evaluated, and to have a highest value if the tag has had its most recent connection with that AP. In this way, those connectable APs for whom a connection value has been evaluated by the tag will yield an AP having a highest connection value. As such, the tag will then select that AP as the AP with which to initiate and establish a connection enabling the transfer of pertinent information of the tag, including identity information of the AP to which the tag is most proximate, to the end user.

Discussion of the above embodiments contemplates that proximity to either an AP 16 or RP 17 may be determined by an EN's implementation of its estimator, i.e., through execution of Equations (1)-(3). As has been mentioned, inclusion of an RP 17 within these executions greatly increases the granularity of the resulting proximity determinations which enable a final determination of an actual position of the EN 14 at the network 22.

Innumerable settings provide for the opportunity to reap a variety of benefits to be gained from an ability to learn a precise location of assets, such as ENs (and/or objects with which they may be associated). These settings may include factories, crop fields, and buildings such as hospitals. Relatedly, the benefits may include an ability to track when and where materials, resources, and personnel are located at a given time. As a result, optimizations for the following non-limiting examples of scheduling, material allocation, and other types of productivity levels associated with heightening the prospect for attaining desired monetary and procedural goals which are in any way tied to knowing the location of an asset may be further made more obtainable when the accuracy of the asset's actual location is refined.

Many of the above settings would benefit from the placement therein of a plurality of RPs 17 and an ability to more acutely determine a location of an EN 14. Accordingly, embodiments herein contemplate that the EN 14 may be configured to, as an alternative to the estimation(s) provided in accordance with Equations (1)-(3), otherwise determine which of the plurality of RPs 17 is nearest in proximity to the EN 14 by evaluating a coordinate location of each of respective ones of the plurality alongside an evaluation of their RSSs. This way, the alternative estimation performed by the EN 14 enhances the outcome determined in accordance with Equations (1)-(3) by supplementing it with relative positioning for a given RP 17.

Figure 7:
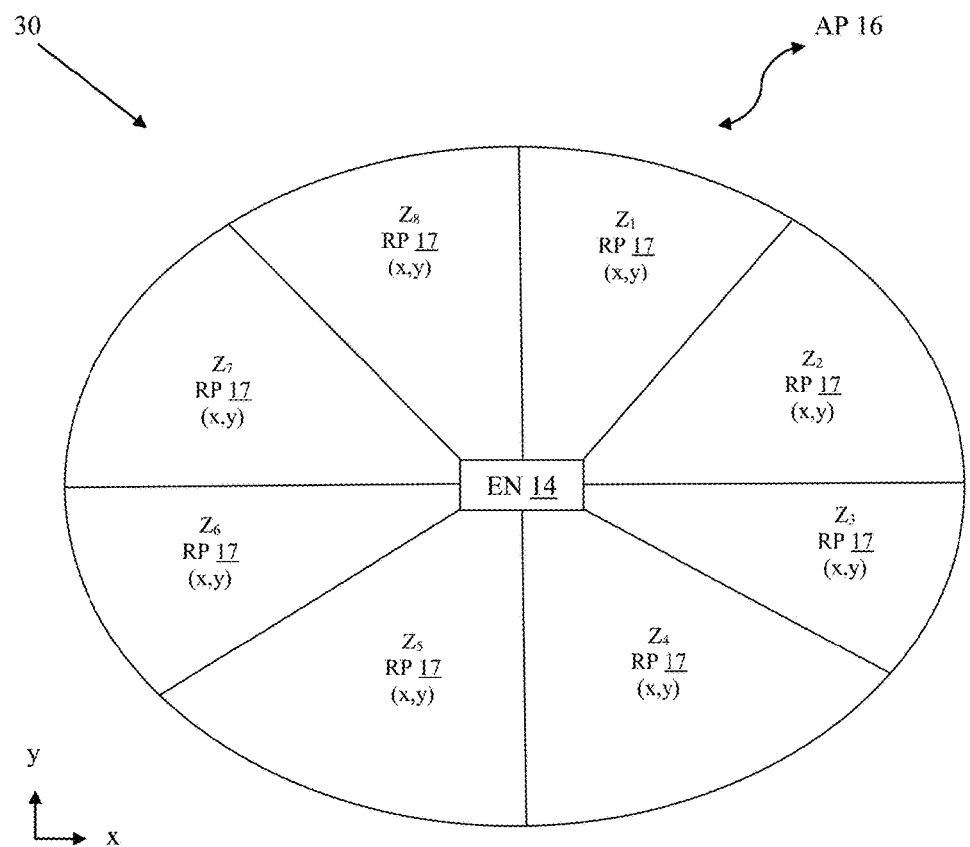
FIG. 7 is an illustration of a zonal configuration of BLE reference points (RPs) relative to which the BLE EN may determine a nearest proximity to one or more thereof, according to embodiments disclosed herein.

Thus, in referring to FIG. 7, there is illustrated an exemplary setting 30, such as may be implemented on a floor of a building whereby an EN 14 is confronted with determining a nearest proximity RP 17 from among a plurality of RPs 17 each of which is separated by an artificial boundary such as a wall. Determining of the nearest proximity is contemplated to reduce distortions in location estimation due to interference caused by such a boundary, or other interference, as the EN 14 moves throughout the floor.

Generally, and for ease of discussion, setting 30 corresponds to a predetermined floor plan having a number of zones (Z) each containing an RP 17 (though more than one RP 17 may be contained within any one zone). Upon activation, RP 17 will initially function as an EN 14 so as to receive, via communication with network 22 through AP 16, its initial provisioning to function as an RP 17. Such provisioning will also include assigning, based on the network's own mapping of RPs 17 within the setting 30, a set of coordinates to the RP 17 to identify the exact location of the fixed location of the RP 17 within the setting 30. As will be understood, the setting 30 may be of any configuration, as will the nature of the coordinates that comport therewith. In the interest of brevity and for purposes of explanation herein, such coordinates of any one RP 17 may be assigned as Cartesian coordinates according to x-y axes made applicable upon setting 30.

With continuing reference to FIG. 7, setting 30 may be divided into an exemplary number of zones $Z_1$ through $Z_8$, though other types of configurations and divisions are contemplated. Although shown as containing a single RP 17 in each zone, it will be understood that multiple RPs 17 may be stationed within a zone in accordance with the particularized layout of setting 30. This way, EN 14 may detect respective beacon advertisements which are broadcast from the one or more RPs 17 so as to estimate a nearest proximity thereto.

As has been discussed, each RP 17 will be associated with its own (x,y) coordinate and zone description according to setting 30 as defined by network 22. In other words, network 22 retains a mapping of each of the RPs 17 according to their (x,y) coordinate and zonal locations, and is enabled to communicate such information to one or more APs 16 operating in and/or relative to the setting 30. For instance, each AP 16 operating within setting 30 may be preloaded, i.e., provisioned by network 22, with RP 17 coordinate and zonal location information.

As EN 14 moves throughout setting 30, it is contemplated that it obtain position information, and specifically the (x,y) coordinate information, of a detected one or more RPs 17, according to one of at least two collection methods. First, the EN 14 may collect the (x,y) coordinate information of any RP 17 as data that is included in any RP advertisement received by the EN 14. Second, each RP 17 may be configured to broadcast, as part of its advertisement, area information indicating that it belongs to, for instance, a particular area or zone, e.g., one of $Z_1$ through $Z_8$, as exemplary of the area information within setting 30, which, as discussed above, may be of any configuration such that the area information may be described other than by zones. Having received the advertisement, the EN 14 may then query the AP 16 for information regarding RPs for the received area or zone, and receive from an AP 16 to which it has connected (according to Equation 4) the coordinate information and corresponding RP association for all RPs 17 located within the received area or zone. Notably, the coordinate information transmitted by the AP 16 may also include a graph of portions of the setting 30 in which there exists an opportunity for allowable path and transitions. Such a graph will be particularly applicable in the instance in which the setting 30 is embodied as a floorplan comprising various arrangements of doorways and hallways, for instance. The query by the EN 14 may be made recursively of the same or a different AP 16 with respect to zones that the EN 14 may successively encounter. The result is that the EN 14 accumulates a mapping of the RPs 17 according to their (x,y) coordinates, whether obtained solely from RP advertisements or from fulfillment of the request(s) by one or more APs 16.

In view of the above, an EN 14 is equipped to estimate the nearest RP 17 within setting 30 based on, with respect to a given one or more RPs 17, both (a) RSS and (b) coordinate information. As such, the estimate conducted by the EN 14 is supplemented by the coordinate information, in contrast to the RSS evaluation discussed above in connection with Equations (1)-(3). Thus, it will be understood that this supplementation represents an alternative EN location estimate relative to the estimate otherwise achieved solely in accordance with Equations (1)-(3).

Calculation by the EN 14 of this alternative estimate may be carried out according to several techniques. They include performing, for a plurality of advertisements received from an RP 17, (A) a determination of a weighted average of coordinate information and RSS to achieve a coordinate estimate of the EN 14 to the RP 17, (B) a determination in accordance with trilateration, and (C) a determination in accordance with simplified trilateration. Each of these techniques is discussed in greater detail below.

(A) Weighted Average of RP Coordinate Information and RSS

Since an EN 14 has at its disposal both coordinate information and RSS for a given RP 17 which it has detected, it makes sense to determine an actual estimate of a coordinate location of the EN 14 within exemplary setting 30. Such an actual estimate of the EN's location is obtainable based on the received coordinates for all the RPs 17 whose advertisements have been received by the EN 14. Once obtained, the actual estimate is compared to each of the received RP coordinates. Based upon this comparison, the EN 14 can then report its location to the best AP 16 connection in terms of the MAC address of the RP 17 whose coordinates are nearest, i.e., most closely match, the actual coordinate estimate determined by and for the EN 14 itself.

Calculation of the estimated EN 14 coordinate is performed individually (and identically) for each x and y component thereof. For instance, the x component is determined with respect to the x coordinate component for a given RP 17, as provided below in Equation (5).

$$x = \sum_{i=1}^{N} a_i x_{RP,i}, \quad \text{Equation (5)}$$

in which N represents the number of reference points, $x_{RP,i}$ represents the x component of the RP's coordinate location, and $a_i$ represents a weighting factor assigned to each observation based on the RSS for the given reference point as detected by the EN 14. The weights, $a_i$, are calculated as provided in Equation (6), wherein $$a_{RP,i} = \frac{r_i - r_{min}}{\sum_{i=1}^{N} r_i - r_{min}},$$

in which $r_i$ represents the RSS for a given RP as detected by the EN 14, $r_{min}$ is the sensitivity (in dBm) of the receiver. Throughout, the weights, $a_i$, sum to one, as per Equation (7), wherein $$\Sigma_{i=1}^{N} a_{RP,i} = 1.$$

(B) Trilateration

In this technique, an EN 14 will employ a path loss model (such as a free space path loss (FSPL) model) to estimate its location in terms of which RP 17 is most proximate. The resultant path loss is assessed for each RP 17 relative to a an appropriate likelihood function, whereby maximization thereof represents the greatest proximity to the EN 14.

More specifically, the path loss (in dBm) may be expressed as follows, per Equation (8), wherein $$P_L = \frac{P_t}{P_r} = \left(\frac{4\pi d}{\lambda}\right)^2,$$

in which $P_t$ and $P_r$ represent the transmit and receive powers of an RP 17 and EN 14, respectively, d (in meters) is the distance between the transmitter and receiver thereof, respectively, and λ (in meters) is the wavelength of the radio emission. Multiplicative effects on the transmission channel, such as body occlusion and structural loss, are combined with occurrences of additive noise.

Figure 7A:
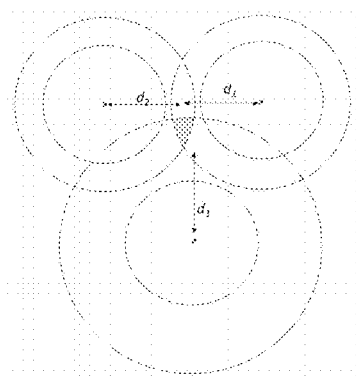
FIG. 7A is a diagrammatic illustration of a nearest proximity determination according to a trilateration technique according to embodiments disclosed herein.

FIG. 7A is a diagrammatic representation of the estimated location of the EN 14 according to the trilateration technique, whereby the location of an EN 14 relative to the transmitting RPs 17 is indicated by the shown intersection.

As shown in FIG. 7A, the distance, $d_i$ is a Euclidean distance relative to the location vector state, e.g., x-y coordinates, of a given $RP_i$, or $L_i$, and the location vector state of the EN 14, $\theta$ (as determined continually upon receipt of beacon advertisement messages and expressed in terms of x-y coordinates as measurements of proximity to the transmitter(s)), and is given by Equation (9), wherein $$d_i = \|\theta - L_i\|_2.$$

When rearranged to provide for a respective EN 14 receive power, $P_{r,i}$ (in dBm), and while substituting Equation (9), Equation (8) may be rewritten as Equation (10), wherein $$P_{r,i} = P_{t,i} + 20\log_{10}\left(\frac{\lambda}{4\pi}\right) - 20\log_{10}\|\theta - L_i\|_2.$$

Further simplification of Equation 10, such that $P_{t,i}$ and $20\log_{10}\left(\frac{\lambda}{4\pi}\right)$ are known, provides consolidation of these known parameters into a constant, a, as shown by Equation (11), in which $$a = P_{t,i} + 20\log_{10}\left(\frac{\lambda}{4\pi}\right).$$

Thus, Equation (10) may be rewritten as Equation (12) and to further include additive noise N, wherein $$P_{r,i} = a - 20\log_{10}\|\theta - L_i\|_2 + N.$$

As such, it will be understood that the observable received power of a transmitting EN 14 is a function of an unobservable vector state, $\theta$, of an EN 14. Therefore, for a given observation, the likelihood function may be expressed as Equation (13), wherein $$p_{R|\theta}(r_i \mid \theta, P_{r,i}) = \frac{1}{\sqrt{2\pi\sigma_{PL}^2}} e^{-\frac{(r_i - P_{r,i})^2}{2\sigma_{PL}^2}}.$$

Further, and in assuming that each observation is considered conditionally independent of another, Equation (13) may be rewritten as Equation 14, in which $$p_{R|\theta}(r_N \mid \theta, P_{r,1}, P_{r,2}, \ldots, P_{r,N}) = \prod_{i=1}^{N} p_{R|\theta}(r_i \mid \theta, P_{r,i}).$$

Accordingly, relative to the above diagrammatic illustration in FIG. 7A representing a location of the EN 14 as the intersection between trilaterated locations from the shown transmitters, a location estimate, $\hat{\theta}_{ML}$, representing a value of $\theta$ that maximizes Equation (14), is given by Equation (15), in which $$\hat{\theta}_{ML} = \underset{\theta}{\operatorname{argmax}} \prod_{i=1}^{N} p_{R|\theta}(r_i \mid \theta, P_{r,i}),$$

and may be reduced to either Equation (16) or (17), as shown respectively below.

$$\hat{\theta}_{ML} = \underset{\theta}{\operatorname{argmax}} \prod_{i=1}^{N} \ln p_{R|\theta}(r_i \mid \theta, P_{r,i}) \quad \text{Equation (16)}$$

$$\hat{\theta}_{ML} = \underset{\theta}{\operatorname{argmax}} \, C1 + \frac{1}{2\sigma_{PL}^2} \sum_{i=1}^{N} (r_i - P_{r,i})^2 \quad \text{Equation (17)}$$

Based on the above, the maximum likelihood estimate, $\hat{\theta}_{ML}$, indicating the trilaterated position of an EN 14 may be expressed according to Equation (18), in which $$\hat{\theta}_{ML} = \underset{\theta}{\operatorname{argmax}} \, C1 + \frac{1}{2\sigma_{PL}^2} \sum_{i=1}^{N} (r_i - P_{r,i})^2,$$

which may be further reduced and expressed (through the exclusion of inapplicable parameters) as the following Equation (19) providing $$\hat{\theta}_{ML} = \underset{\theta}{\operatorname{argmax}} \sum_{i=1}^{N} (r_i - P_{r,i})^2.$$

In the above respects, the determined nearest proximity to a RP 17 is evaluated via the above-discussed trilateration in connection with RSS for a plurality of RPs encountered by the EN 14. In these ways, the coordinates provided to an RP 17 may be more acutely interrogated in light of corresponding RSS to narrow an estimation of proximity of the EN 14.

(C) Simplified Trilateration

In an effort to smoothen the resultant likelihood(s) yielded by Equation (14), such implementation of that equation and likelihood(s) rendered thereby may be considered to be a multidimensional Gaussian. In doing so, an evolving multidimensional covariance of a combined Gaussian likelihood is disregarded, such that there is yielded a combined likelihood function having symmetric geometry in the x and y directions, i.e., $\sigma_x^2 = \sigma_y^2$, with correlation coefficients $\rho_{xy} = \rho_{yx} = 0$. Accordingly, the standardized two dimensional covariance, relative to a combination of at least a pair of likelihood functions, of $$\Sigma = \begin{bmatrix} \sigma_x^2 & \rho_{xy}\sigma_x\sigma_y \\ \rho_{yx}\sigma_x\sigma_y & \sigma_y^2 \end{bmatrix}$$

is reduced to $$\Sigma = \begin{bmatrix} \sigma_{PL}^2 & 0 \\ 0 & \sigma_{PL}^2 \end{bmatrix}.$$

Based on the above, combinations of multidimensional likelihoods, as may be yielded by Equation (14), are simplified to provide series of one dimensional likelihood combinations that are projected onto the dimension between the pair of likelihoods under consideration. Additionally, as a result of the above simplification(s), the maximum likelihood estimate, $\hat{\theta}_{ML}$, may be replaced as the mean of the determined Gaussian likelihood.

Further, it is contemplated that, once having accumulated aggregate coordinate information for setting 30, the EN 14 may employ Equations (1)-(3) to further refine any estimated EN location determined in accordance with techniques (A)-(C). Doing so allows the EN 14 to employ the accumulated knowledge of the setting 30 in order to reactively hone its proximity determination to a given RP 17 when further RP advertisements are received.

Figure 8:
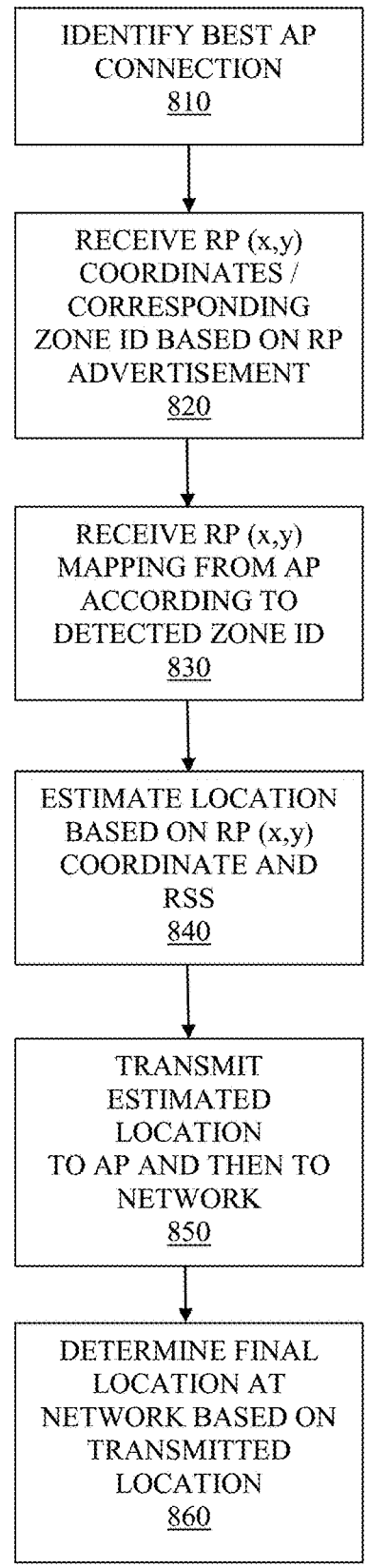
FIG. 8 is a sequence diagram setting forth a manner in which the BLE EN may determine the nearest proximity in accordance with FIG. 7.

Operation of the EN 14 in accordance with the above-described alternative manner of EN location determination with respect to a RP 17 is depicted in FIG. 8. Therein, the operation starts at decision block 810 whereat an EN 14 will identify, in accordance with Equation (4), the best AP connection within, for example, the discussed setting 30. Flow proceeds to block 820 in which the EN 14 will receive, as part of a RP's advertisement, either (a) all of the (x,y) coordinates or (b) the Zone ID, for those RPs 17 which are detectable. At block 830, in response to querying the connected AP 16 for the (x,y) coordinates for RPs within any Zone ID which it has received, the EN 14 receives a mapping of such coordinates to their respective RPs within the identified zone. At this stage, it is likely that, since multiple RP advertisements may mix transmission of (x,y) coordinates alone with identifications of Zone IDs, the EN 14 has accumulated its own RP 17 mapping of those portions of setting 30 which it has traversed. Accordingly, based upon this mapping, the EN 14 is equipped, at decision block 840, to estimate its own coordinates according to its collected RP 17 (x,y) coordinates and their corresponding RSS. At block 850, once the estimate is complete, the EN 14 may then transmit to the connected AP 16 its estimated location (in terms of the particular RP 17 to which it is most proximate according to the estimate of its own EN location). The determination as to which RP 17 is most proximate the EN 14 is made based on the EN 14 conducting a comparison of its own estimated location to the (x,y) coordinates for all those RPs 17 for which it has detected a beacon advertisement message. As a result, the transmitted location will comprise messaging detailing the MAC address of the particular RP 17 that has been determined as being nearest in proximity to the EN 14. The AP 16 will then, at block 860, transmit such MAC address to network 22 for receipt and analysis thereby to verify the EN's estimated location relative to knowledge of the setting 30, and perhaps, prior location estimates reported by the EN 14 in combination with timing of those reports. In other words, network 22 may conduct its own analysis to ensure that the estimated location comports with a predetermined time and distance threshold so as to discard location estimates that may exceed such threshold.

In each of the above-discussed embodiments, it has been advantageous to determine a location of an EN as a function of its proximity to either an AP 16 or RP 17 so as to optimize the variously identified practical applications. Such determinations aid in the carrying out of one or more of those applications particularly when an approximation of that location is satisfactory. However, many situations exist in which it is desirable and/or necessary to know the location of an EN 14 (and/or entity with which it is associated) with greater specificity. Non-limiting examples of these situations may include those in which the whereabouts of personnel and inventory are in question and need to be quickly ascertained in order to address matters of employee production and loss prevention, respectively.

In an effort to track the location of the EN with greater transparency, the following discussion addresses transmitting from a RP 17 both its respective beacon advertisement message as well as an ultrasonic waveform (waveform) to the EN 14, in which analysis of the waveform by the EN 14 is conducted in accordance with a location determination process, such as the above trilateration or simplified trilateration process, to yield a specific EN 14 coordinate location within setting 30, for example. More particularly, based on the EN's knowledge of the x-y coordinates of the transmitting RPs and a determined distance thereto based on the waveform, a x-y coordinate of the EN 14 may be learned and reported via the AP 16 selected to connect with the network 22. Additionally, determination of the location of the EN 14 is further contemplated to yield, as discussed below, a three-dimensional, or x-y-z, coordinate thereof so as to provide, for instance, a height aspect of the location of the EN 14. In this way, such EN 14 location will be able to be ascertained in a case in which setting 30 embodies an exemplary warehouse, and provide detail of the specific placement of the EN 14 on any one of elevated platforms, whether shelving, racking or storage bins, for example.

Figure 9:
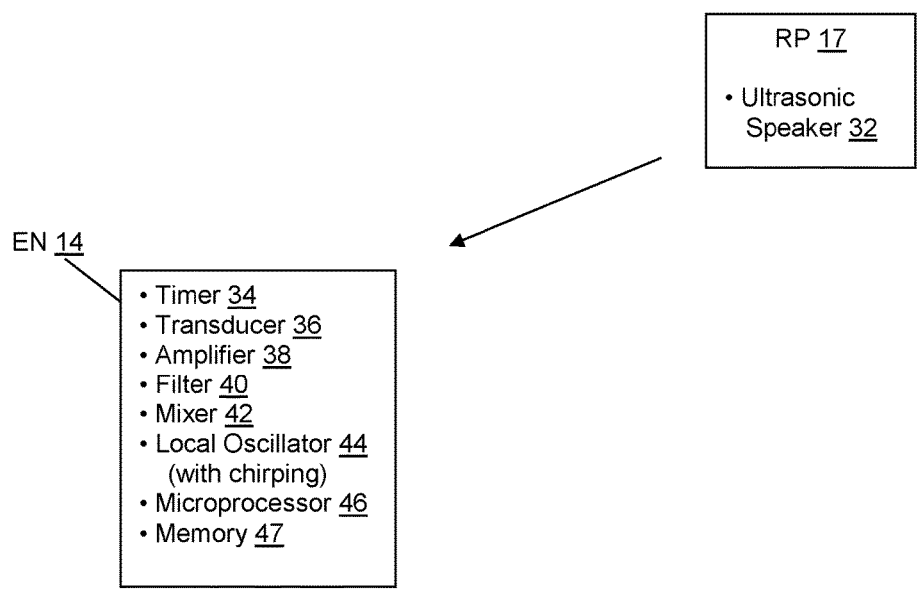
FIG. 9 is a block diagram illustrating an exemplary BLE EN and BLE RP, according to embodiments herein directed to determination of a location of the BLE EN via receipt thereby of an ultrasonic waveform transmitted by the BLE RP.
Figure 10:
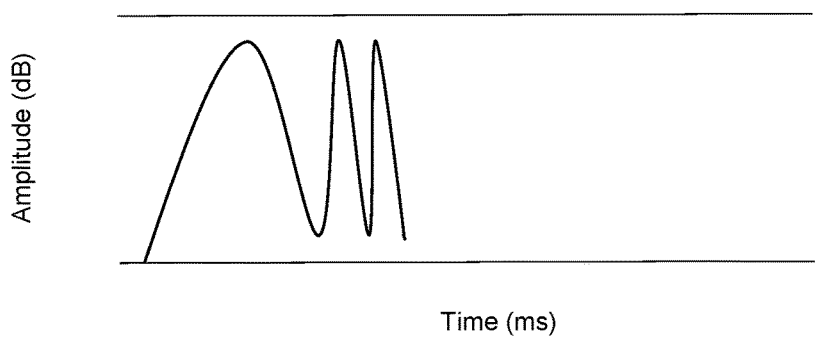
FIG. 10 is a diagrammatic illustration of transmission of the ultrasonic waveform from the BLE RP, according to FIG. 9.

In these respects, FIG. 9 illustrates the components of the EN 14 and RP 17 which are specific to the transmission and receipt of the waveform for enabling determination of the location mentioned above. As shown, RP 17 comprises an ultrasonic speaker 32 configured to announce the waveform. Such waveform is chirped so as to provide for a series of alternating increases and decreases in frequency, with an increasing chirp rate and decreasing chirp duration, as shown in FIG. 10, for example. As is also shown in FIG. 9, EN 14 comprises one or more of each of a timer 34, a wireless microphone and transducer 36, an amplifier 38, a filter 40, a mixer 42, local oscillator (LO) (with chirping) 44, a microprocessor 46, and a memory 47.

Each waveform transmitted from the RP 17 contains various items such as channel coding, chirp parameters setting forth, for example, the variance in chirp rate for chirps of the waveform, as well as durations for pauses between chirps of the waveform.

Upon transmission of the beacon advertisement message from the RP 17, the RP 17 further, and subsequently within a predetermined period of time from transmission of its beacon advertisement message, transmits its waveform. In the interim, and in response to receipt of the beacon advertisement message, the EN 14 activates its timer 34. That is, receipt of the beacon advertisement message triggers an initiation of detection of, i.e., listening for, the waveform by starting the timer 34 at time t0, for instance (assuming no other beacon advertisement message has been received). When the EN 14 receives an initial chirp of the waveform, it marks receipt of that chirp at time t1, for example. This process is repeated for all chirps of the waveform. Thus, for example, based on the differential of t1–t0, the EN 14 may calculate the time of flight (TOF) of the initially received waveform chirp from the RP 17. More specifically, as is explained below, the total TOF of the waveform is determined based on a sum of the temporal offsets for each of the chirps that are received. The aggregation of all temporal offsets for each of the waveform chirps yields the total TOF, which is then multiplied by the speed of sound, e.g., 343 m/s (assuming dry air as the medium), to yield a distance between the RP 17 and EN 14.

It is also contemplated that the beacon advertisement message transmitted from the RP 17 may be configured to include, in an appropriate field thereof, a count-down period defining a transmission delay time, i.e., the predetermined period of time referenced above, for transmitting the waveform. That is, the EN 14 is configured to recognize this period as a frame of time at the end of which the RP 17 will transmit its waveform after first having transmitted its beacon advertisement message. For instance, the count-down period may be 10 seconds (s), or another predetermined period of time. As such, EN 14 will activate its timer 34 at time t0', representing, in the above example, 10 s after receipt of the beacon advertisement message. In this way, power consumption of the EN 14 is optimized whereby the EN 14 may lay dormant during the period of time between receipt of the beacon advertisement message from the RP 17 and the elapse of the count-down period.

Chirping of the waveform enables its TOF to be segmented according to the configured chirps. Accordingly, each incremental portion of the waveform demarcated by chirps may be analyzed to derive partial TOF measurements. This way, factors which may otherwise influence a degradation in measurement of the accuracy of total TOF as well as the distance determined therefrom, such as path loss, may be mitigated.

Figure 11:
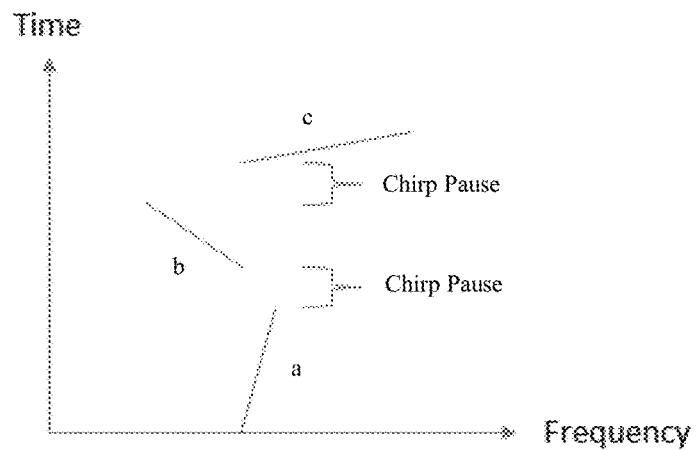
FIG. 11 is a diagrammatic illustration of a relationship between time and frequency at a time of receipt of the ultrasonic waveform by the BLE EN.

In referring to FIG. 11, there is shown a series of chirps a, b, and c of the waveform of FIG. 10 which are separated by corresponding chirp pauses indicative of a shifting in frequency of the waveform. As indicated, sequential chirping of the waveform is provided in which chirp a represents an increase in frequency, and is separated by a chirp pause at the transition of chirp b representing a decrease in frequency, and which is separated by a chirp pause prior to chirp c representing a subsequent increase in frequency. Because of the chirping of the waveform, TOF measurements corresponding to the chirps may be obtained incrementally, such that the aggregation of the measurements yields a total TOF, as is discussed in more detail below.

As noted above, EN 14 comprises a LO 44. The LO 44 is likewise configured to chirp its generated signal. Upon generation of the LO 44 signal, the ultrasonic waveform, and specifically chirps thereof, are compared to chirps of the LO 44 generated signal. Additionally, upon receipt at the EN 14, the waveform is mixed with the chirped signal of the LO 44 so as to de-chirp the waveform and to produce a series of single-frequency tones which may be measured by microprocessor 46 via a Fast Fourier Transform (FFT). Notably, echoes received as a result of successive chirps are blended over a frequency range resulting from the mixing.

Figure 12:
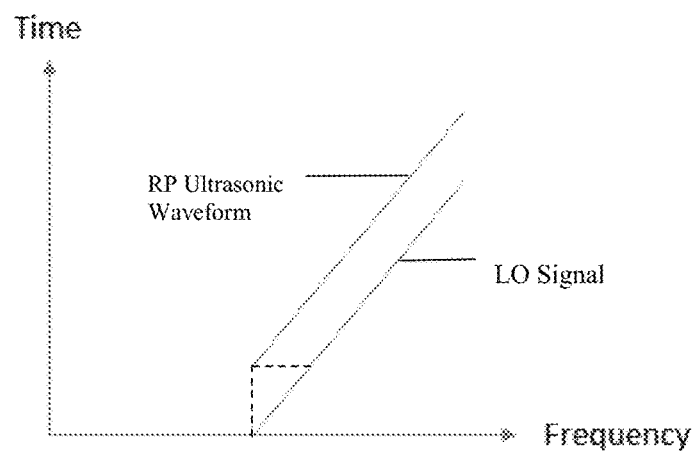
FIG. 12 is a sequence diagram setting forth a manner in which the BLE EN determines a distance from the BLE RP in response to transmission of the ultrasonic waveform therefrom.

As shown in FIG. 12, and since that the LO 44 is started upon detecting an initial chirp of the waveform, it will be understood that chirps of the waveform are delayed, i.e., temporally offset, from the starting of the LO 44, by their respective transit time from the RP 17 to the EN 14. As is further shown by the dotted line relationship, a difference in chirp frequency of each of the waveform and the signal generated by the LO 44 is directly related to the temporal offset. In other words, the chirp rate of the waveform, or the rate at which the waveform changes frequency, defines the direct relationship between the temporal offset and the difference in frequency between the indicated waveform and LO 44 signal.

Because of this relationship, each measured temporal offset between successive chirps of the waveform together with the chirp pause therebetween are used as a gauge for determining the restarting of the LO 44 in anticipation of receipt of a next chirp. Thus, as the waveform proceeds with increasingly faster chirps, timer 34 marks a respective, successive temporal offset for each chirp. Timer 34 is adjusted by the chirp pause (the duration of which is transmitted in the beacon advertisement message). This way, an accuracy of the offset measurement is ensured, such that the sum of the respective offsets equals the total TOF of the waveform.

Throughout each chirp pause occurring during the entirety of the waveform, each of the corresponding temporal offsets is calculated by microprocessor 46 and saved in a non-volatile or volatile memory 47. As each chirp is received, this process is repeated. Alternatively, in order to determine whether the EN 14 is within a predetermined range of the transmitting RP 17, a predetermined number of chirps may be processed (in order to reduce a processing burden and resultant energy consumption at the EN 14).

Based on the above discussion, the determined distance to the RP 17, as derived from the TOF of the waveform, may also be achieved with respect to multiple RPs whose beacon advertisement message and ultrasonic waveform are received at the EN 14. Also, it will be understood that the processes of determining TOF and corresponding RP-EN distance may be carried out for multiple transmissions of beacon advertisement messages and waveforms from a particular RP. Further, since the EN 14 will be equipped with the knowledge of the x-y coordinates, a third dimensional z coordinate may also be ascertained, as discussed below, for the RPs 17, whereby the location determination may be exemplified by a least squares approach to enable the EN 14 to substantially pinpoint a 3D coordinate location thereof. Thus, whether the EN determined coordinate location is determined as either 2D or 3D in its form, such coordinate location, instead of a proximity to an RP 17 reported as the MAC address thereof, may then transmitted by the EN 14 to the network 22 via the connected AP 16.

With the ability to obtain such detail in location determination, the EN 14 is configured to provide end users a specificity of its whereabouts which aids in narrowing information needed to accomplish the applications and associated tasks discussed herein. As such, monetary and other benefits which may be derived from learning this narrowed information may be optimized.

Figure 13:
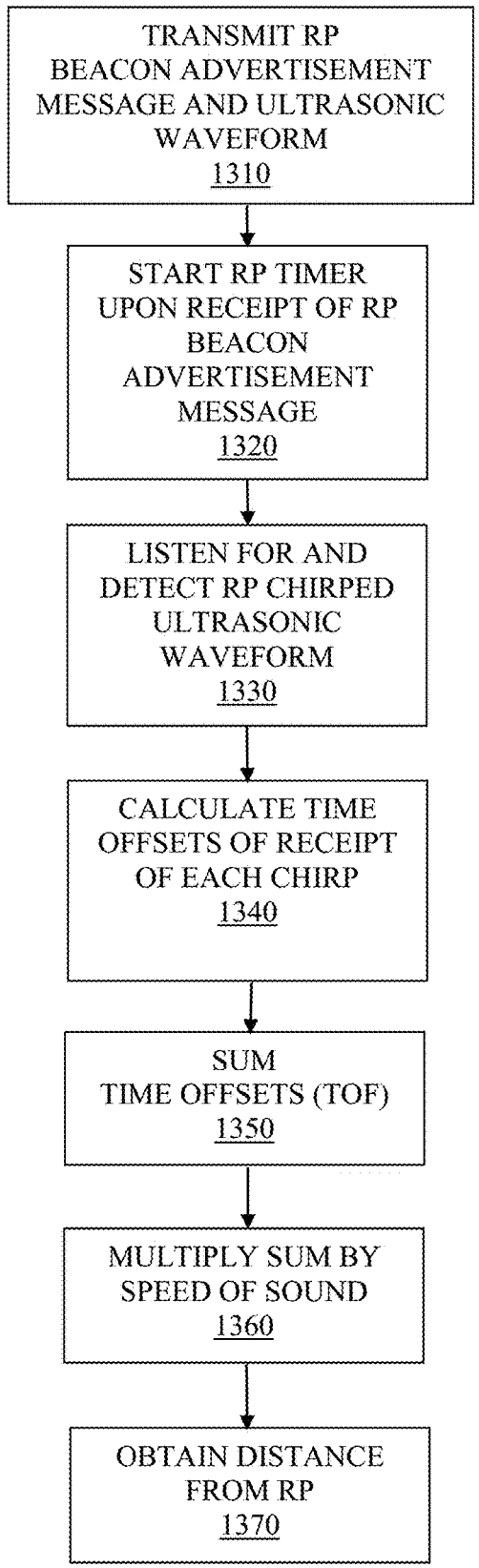
FIG. 13 is a sequence diagram setting forth a manner in which the BLE EN determines its location within a coordinate system as a result of receipt of transmissions of multiple ultrasonic waveforms.

In referring to FIG. 13, there is illustrated a process for receipt of a beacon advertisement message from a respective RP 17, and for determining a distance from the RP 17 to the EN 14, in accordance with the foregoing discussions. The process begins at 1310 in which the RP 17 transmits its beacon advertisement message, and then shortly thereafter its ultrasonic waveform. At 1320, the EN 14, in response to receipt of the beacon advertisement message, starts its timer 34 and begins listening for the ultrasonic waveform at 1330. As shown in FIG. 10, the waveform begins with longer, slower chirps enabling the EN 14 to acquire the waveform over a longer period of time. Throughout progression of the waveform, the EN 14, as indicated at 1340, calculates temporal offsets owing to chirps of the waveform and generated signals of the LO 44. These offsets are then summed at 1350 to generate a TOF of the waveform. Based on the generated TOF, the same is multiplied by the speed of sound at 1360 to arrive at a distance between the RP 17 and the EN 14 at 1370. As has been discussed above, it will be understood that the generated TOF and corresponding RP 17-EN 14 distance based thereon may be calculated according to a given number of chirps. Further, it will also be understood that an increasing chirp rate of the waveform will yield a narrowing of the ranging to the RP 17 as the waveform is transmitted.

Figure 14:
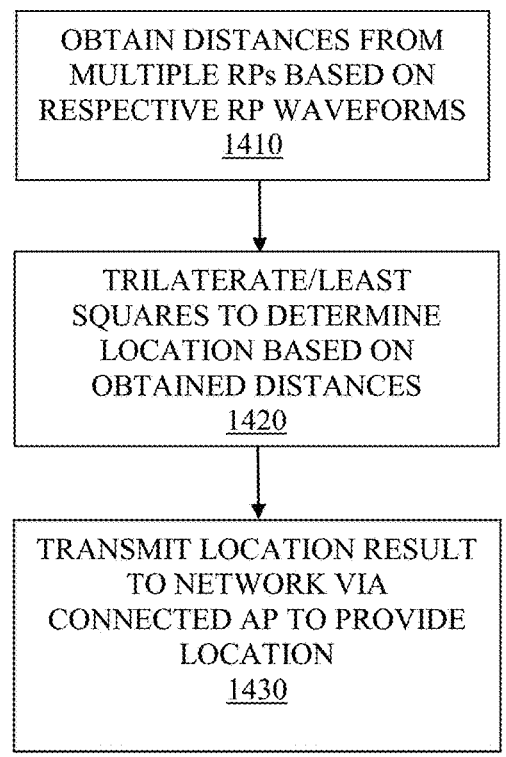
FIG. 14 is a sequence diagram setting forth a manner in which the BLE EN determines its coordinate location according to FIG. 13.

Relative to the receipt of multiple beacon advertisement messages and ultrasonic waveforms from respective ones of RPs 17, FIG. 14 illustrates a process for determining a coordinate location of the EN 14 within a setting, such as setting 30, in which the EN 14 and the RPs 17 operate. Thus, at 1410 the EN 14 obtains the distances to each of the RPs 17 based on their respectively transmitted waveforms. At 1420, the EN operates to determine its coordinate location based on the obtained distances. At 1430, the EN 14 transmits the determined coordinate location to the network via its connected AP 16.

In connection with the above discussion of the TOF determinations measured by a respective EN 14, the present embodiments contemplate that, in an instance in which waveforms from a plurality of RPs 17 are received, determination of the location of the EN 14 may instead be achieved via a least squares approach. Such an approach may be necessary in which RF reception is hampered/disallowed due to any number of scenarios, including structural obstruction within, for example, setting 30. In these regards, waveforms from at least three RPs 17 are necessary to yield a two dimensional (2D), i.e., x-y, location, while waveforms from at least four RPs 17 are necessary to yield a three dimensional (3D), i.e., x-y-z, location. The least squares solution may be embodied in accordance with the equations below, in which the vector solution minimizes squared error.

$$A\vec{x} = \vec{b}$$

$$\vec{x} = (A^T A)^{-1} A^T \vec{b}$$

Relative to the above, it will be understood that matrix A may be configured in an exemplary manner, as below, to reflect a series of two columns if a 2D location is to be yielded, and alternatively, a series of three columns if a 3D location is sought via the $\vec{x}$ vector solution. Correspondingly, and as also shown below, vector $\vec{b}$ will be configured to include as many rows as there are RPs to consider, i.e., whose waveform has been evaluated by the relevant EN 14.

$$A = \begin{pmatrix} x_2 - x_1 & y_2 - y_1 & z_2 - z_1 \\ x_3 - x_1 & y_3 - y_1 & z_3 - z_1 \\ \vdots & \vdots & \vdots \\ x_n - x_1 & y_n - y_1 & z_n - z_1 \end{pmatrix}, \vec{x} = \begin{pmatrix} x - x_1 \\ y - y_1 \\ z - z_1 \end{pmatrix}, \vec{b} = \begin{pmatrix} b_{21} \\ b_{31} \\ \vdots \\ b_{n1} \end{pmatrix}$$

Figure 15:
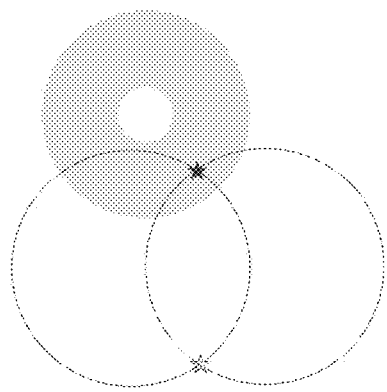
FIG. 15 is a diagrammatic illustration of a manner in which the BLE EN coordinate location may be determined in view of a first instance of aggregated time of flight (TOF) and received signal strength (RSS) data.

In instances in which insufficient TOF data is available, it is also contemplated that such insufficient data may be compared as against the location determinations achieved through the RSS trilateration and simplified trilateration techniques discussed above. When employing this comparison, the EN 14 will analyze which trilateration solution best matches acquired TOF data to resolve the location of the EN 14. Matching in this case may be in accordance with a predetermined threshold so as optimize the desired resolution. For example, such resolution in shown diagrammatically in FIG. 15 in which the TOF solutions are depicted by stars, and wherein the emboldened one thereof represents the true location of the EN 14 since it is within the trilaterated location determination performed based on RSS, relative to the depicted observations.

Figure 16:
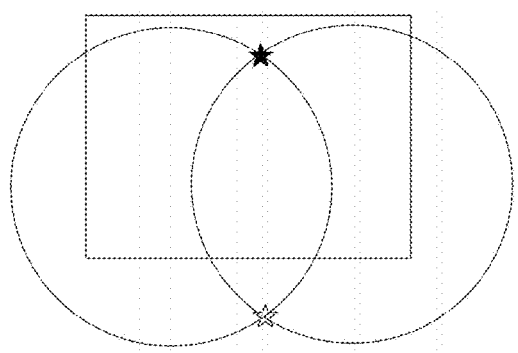
FIG. 16 is a diagrammatic illustration of a manner in which the BLE EN coordinate location may be determined in view of coordinate information for BLE RPs defined within a floorplan within which the BLE EN is operable.

Furthermore, and since an EN 14 will be equipped with coordinate information of those RPs 17 defining the scope of setting 30, such coordinate information may be used by an EN 14 to discard a TOF solution which lies outside the setting 30. This is shown diagrammatically in FIG. 16 in which the rectangle represents setting 30 and the selected TOF location of the EN 14 is represented as the emboldened star since it lies within the setting 30. That is, the TOF location, which is also represented diagrammatically as a star, but nearer the bottom of the diagram, is discarded since in falls outside the setting 30 as defined in part by the coordinates of the transmitting RPs 17.

Figure 17:
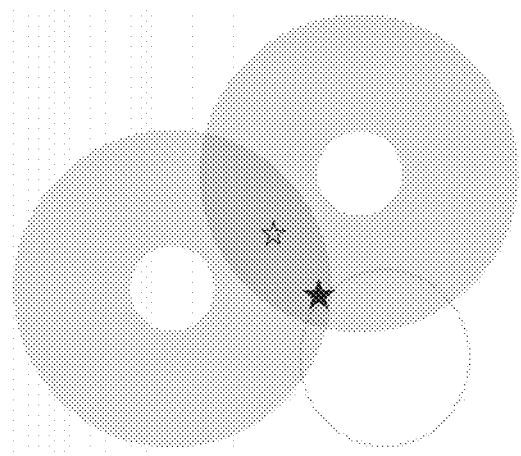
FIG. 17 is a diagrammatic illustration of manner in which the BLE EN coordinate location may be determined in view of a second instance of aggregated time of flight (TOF) and received signal strength (RSS) data.

It is also the case that an EN's RSS based location determination may be further refined through use of a TOF solution. Employing such a confirming technique is particularly useful as RSS observations may be deteriorated due to factors such as noise. More specifically, confirmation may be obtained by combining RSS and TOF likelihoods as in Equation (14) above, relative to a mapping of such likelihoods to the relevant polar coordinates, i.e., range and angle. FIG. 17 diagrammatically illustrates the most likely location of the EN 14 in the form of a hollowed star when informed by only RSS data drawn from given RPs 17 (shown as the thickened spheres). When supplemented by the TOF likelihood (as shown by the thinner of the three spheres), the actual location of the EN 14 may be determined as the location (as depicted by the emboldened star) that intersects the range of location determinations corresponding to each of the RSS observations (as depicted by the shaded spheres) and the TOF observation (as depicted by the thinned ring intersecting each of the spheres).

In these ways, it will be understood that the embodiments disclosed herein optimize the efficiency of a BLE-enabled network by, at least, reducing burdens on network resources, as well as by enhancing the likelihood of connection in situations in which multiple end nodes are co-located. It will likewise be understood that the embodiments disclosed herein enable a determination of each of the relative location of an end node in view of its proximity to an access point, and its coordinate location with respect to one or more reference points.

It will be understood that each of the APs 16 and RPs 17 described herein may be configured to include directional and circularly polarized antennas to, respectively, better focus their broadcasts and reduce cross polarization loss sometimes experienced with vertically polarized antennas. This way, EN 14 location determinations may be achieved with increased accuracy.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLE communications system, comprising:
   an end node (EN);
   an access point (AP) configured to connect to a network and transmit a first beacon advertisement message; and
   a plurality of reference points (RPs) each configured to not connect to the network and transmit each of a second beacon advertisement message comprising position information, and an ultrasonic waveform,
   in which the EN is configured to
      detect the first and second beacon advertisement messages and the ultrasonic waveform, and
      initiate a connection with the AP in which, as a result of the connection, the AP is caused to transfer to the network identifying information of each of the EN and the AP,
   wherein the detection of a respective one of the second beacon advertisement messages triggers the EN to begin the detecting of the ultrasonic waveform.

2. The BLE communications system of claim 1, wherein:
   the EN comprises a microphone and a timer, and the detecting of the ultrasonic waveform comprises initiating the timer upon or after receipt of the respective one of the second beacon advertisement messages to determine a time of flight (TOF) of the ultrasonic waveform.

3. The BLE communications system of claim 2, wherein:
   the timer is initiated after receipt of the second beacon advertisement message in accordance with a delay time defined thereby.

4. The BLE communications system of claim 3, wherein:
   the ultrasonic waveform is chirped, and the timer measures temporal offsets of receipt of chirps of the waveform.

5. The BLE communications system of claim 2, wherein:
   the ultrasonic waveform is chirped.

6. The BLE communications system of claim 5, wherein:
   the EN further comprises a chirped local oscillator (LO) and a mixer configured to mix chirps of the ultrasonic waveform with chirps of a signal generated by the LO.

7. The BLE communications system of claim 6, wherein:
   differences in frequency between respective chirps of the ultrasonic waveform and the signal generated by the LO are directly proportional to temporal offsets of receipt of the respective chirps of the ultrasonic waveform.

8. The BLE communications system of claim 7, wherein:
   the EN further comprises a microprocessor configured to aggregate the temporal offsets to define the TOF of the ultrasonic waveform.

9. The BLE communications system of claim 8, wherein:
   the microprocessor is further configured to calculate a distance to each of the plurality of RPs based on the TOF of the ultrasonic waveform transmitted therefrom.

10. The BLE communications system of claim 9, wherein:
    the position information comprises coordinate information, and the microprocessor is further configured to determine a position of the EN based on the calculated distances and the coordinate information.

11. The BLE communications system of claim 10, wherein:
    the EN transmits the determined position via the AP to the network.

12. A BLE communications system, comprising:
    an end node (EN);
    an access point (AP) configured to connect to a network and transmit a first beacon advertisement message; and
    a plurality of reference points (RPs) each configured to not connect to the network and transmit each of a second beacon advertisement message comprising position information, and an ultrasonic waveform,
    in which the EN is configured to
       detect the first and second beacon advertisement messages and the ultrasonic waveform,
       calculate a time of flight (TOF) of the ultrasonic waveform transmitted from each of the plurality of RPs, and determine, within a coordinate system within which each of the EN, RPs and AP are operable, a coordinate position of the EN based on the TOFs, and
       initiate a connection with the AP in which, as a result of the connection, the AP is caused to transfer to the network identifying information of each of the EN and the AP, and the coordinate position.

13. The BLE communications system of claim 12, wherein:
    each ultrasonic waveform is chirped, and each TOF is based on the chirping.

14. The BLE communications system of claim 13, wherein:
    a detection of a respective one of the second beacon advertisement messages triggers the EN to begin the detecting of a chirp of a respective ultrasonic waveform.

15. The BLE communications system of claim 14, wherein:
   each TOF is based on the sum of differences between receipt times of chirps of a respective ultrasonic waveform.

16. The BLE communications system of claim 15, wherein:
   the coordinate position is based on distances to the RPs respectively corresponding to TOFs for each of the detected ultrasonic waveforms.

17. The BLE communications system of claim 16, wherein:
   the coordinate position is determined according to a least squares approach or by trilaterating, based on the distances to the RPs and the respective position information corresponding to the RPs.

18. A method of BLE communication, comprising:
   executing, by one or more processors among a BLE end node (EN), a BLE access point (AP) configured to connect to a network, and a plurality of BLE reference points (RPs) configured to not connect to the network, a set of instructions for
      transmitting a first and a second beacon advertisement message from the AP and each of the plurality of RPs, respectively, each second beacon advertisement message comprising position information,
      transmitting an ultrasonic waveform from each of the plurality of RPs,
      detecting the first and the second beacon advertisement messages at the EN,
      initiating detection of at least one of the ultrasonic waveforms in response to detecting at least one of the second beacon advertisement messages, and
      initiating a connection between the AP and the EN, in which, as a result of the connection, the AP is caused to transfer to the network identifying information of each of the EN and the AP, and a position of the EN based on at least a pair of the ultrasonic waveforms and the position information.

19. The method of BLE communication of claim 18, further comprising:
   determining by the EN a time of flight (TOF) of each detected ultrasonic waveform.

20. The method of BLE communication of claim 19, wherein:
   each detected ultrasonic waveform is chirped.

21. The method of BLE communication of claim 20, wherein:
   the EN comprises a chirped local oscillator (LO) configured to generate a signal comprising a series of chirps in response to receipt of an ultrasonic waveform.

22. The method of BLE communication of claim 21, wherein:
   the TOF for a respective ultrasonic waveform is based on the sum of temporal offsets defined by receipt times of chirps of the ultrasonic waveform as against the generation times of chirps by the LO.

23. The method of BLE communication of claim 22, wherein:
   each respective ultrasonic waveform comprises a series of increasing and decreasing chirps of increasing chirp rate and decreasing duration.

24. The method of BLE communication of claim 23, wherein:
   the position of the EN is determined according to a least squares approach or by trilaterating, based on each of distance derived in accordance with the TOFs of respective ultrasonic waveforms and the position information corresponding to the RPs.

* * * * *